US012320471B2

(12) United States Patent
Swanger et al.

(10) Patent No.: US 12,320,471 B2
(45) Date of Patent: Jun. 3, 2025

(54) CRYOGENIC FLUX CAPACITOR FOR SOLID-STATE STORAGE AND ON-DEMAND SUPPLY OF FLUID COMMODITIES

(71) Applicant: United States of America as Represented by the Administrator of NASA, Washington, DC (US)

(72) Inventors: Adam M. Swanger, Orlando, FL (US); James E. Fesmire, Titusville, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 446 days.

(21) Appl. No.: 16/104,824

(22) Filed: Aug. 17, 2018

(65) Prior Publication Data

US 2019/0056064 A1 Feb. 21, 2019

Related U.S. Application Data

(60) Provisional application No. 62/547,335, filed on Aug. 18, 2017.

(51) Int. Cl.

*F17C 11/00* (2006.01)
*F17C 1/12* (2006.01)
*F17C 3/02* (2006.01)
*F17C 5/00* (2006.01)

(Continued)

(52) U.S. Cl.

CPC ................ *F17C 11/00* (2013.01); *F17C 1/12* (2013.01); *F17C 3/02* (2013.01); *F17C 5/002* (2013.01);

(Continued)

(58) Field of Classification Search

CPC .. F17C 13/026; F17C 1/12; F17C 7/00; F17C 3/02; F17C 5/002; F17C 11/00;

(Continued)

(56) References Cited

U.S. PATENT DOCUMENTS 4,886,769 A * 12/1989 Kuma ................ B01J 20/28023 428/116
6,487,866 B1 * 12/2002 Fesmire ................ G01N 25/18 374/44

(Continued)

*Primary Examiner* — Frantz F Jules
*Assistant Examiner* — Webeshet Mengesha
(74) *Attorney, Agent, or Firm* — Jonathan J. Leahy; Mark W. Homer; Trenton J. Roche

(57) ABSTRACT

A cryogenic flux capacitor (CFC) storage system includes a CFC core module having an inner container comprising one of: (i) a vessel; and (ii) a membrane that contains a substrate material. Fluid paths in the substrate material distribute fluid during charging and discharging. Nanoporous media is attached to the substrate material that receives fluid via physical adsorption during charging. A thermally conductive support layer maintains position of the substrate material within the inner container. The thermally conductive support layer conductively distributes thermal energy within the inner container. An outer insulating container encompasses the CFC core module. At least one fluid conduit directs transfers of the fluid in a gaseous or liquid state from a source subsystem into the CFC core module during charging and the fluid in a gaseous state out of the CFC core module during discharging to a destination subsystem that utilizes the fluid in a gaseous state.

16 Claims, 16 Drawing Sheets

(51) Int. Cl.
*F17C 7/00* (2006.01)
*F17C 13/02* (2006.01)

(52) U.S. Cl.
CPC .............. *F17C 7/00* (2013.01); *F17C 13/026* (2013.01); *F17C 2203/0391* (2013.01); *F17C 2203/0685* (2013.01); *F17C 2205/0352* (2013.01); *F17C 2223/0161* (2013.01); *F17C 2227/0304* (2013.01); *F17C 2227/0337* (2013.01); *F17C 2250/0439* (2013.01); *F17C 2250/0631* (2013.01)

(58) Field of Classification Search
CPC ...... F17C 2203/0685; F17C 2203/0391; F17C 2227/0337
See application file for complete search history.

(56) References Cited

U.S. PATENT DOCUMENTS

| | | | | |
|---|---|---|---|---|
| 7,977,411 B2 * | 7/2011 | Williams | C09K 21/02 | 523/218 |
| 2002/0061396 A1 * | 5/2002 | White | B29C 70/12 | 428/293.4 |
| 2005/0016198 A1 * | 1/2005 | Wowk | A01N 1/0257 | 62/371 |
| 2008/0011617 A1 * | 1/2008 | Struthers | F17C 11/005 | 206/0.7 |
| 2010/0275617 A1 * | 11/2010 | Williams | C09K 21/02 | 252/79 |
| 2015/0122670 A1 * | 5/2015 | Stautner | F17C 11/00 | 206/0.7 |

* cited by examiner

CRYOGENIC FLUX CAPACITOR FOR SOLID-STATE STORAGE AND ON-DEMAND SUPPLY OF FLUID COMMODITIES

Pursuant to 35 U.S.C. § 119, this patent application claims the benefit of and priority to U.S. Provisional Patent Application Ser. No. 62/547,335, filed Aug. 18, 2017, the contents of which are hereby incorporated by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND OF THE INVENTION

1. Technical Field

The present invention relates in general to fluid storage systems and, more particularly, to fluid storage systems that store fluids molecules by physical adsorption, using cryogenic temperatures for higher energy densities.

2. Description of the Related Art

Storage and transfer of fluid commodities such as oxygen, hydrogen, natural gas, nitrogen, argon, etc., is an absolute necessity in virtually every industry on Earth. These fluids are typically contained in one of two ways: (i) as low pressure, cryogenic liquids; or (ii) as high-pressure gases. Cryogenic liquids afford high energy and volume densities but require complex storage systems to limit boil-off, need constant settling in zero-gravity environments, and are not well suited for overly dynamic situations where the tank orientation can change suddenly (in an airplane or car for example). The complex cryogenic liquid tanks include vacuum jackets and suspension systems between inner and outer vessels to enable storage of liquid with reasonably low boil-off losses. These tanks are large, heavy, and cannot be made in conformal shapes.

Conversely, high pressure gas storage bottles are not affected by tank orientation and can be kept at room temperature, hence are considerably less complicated pieces of equipment. However, these vessels are heavy due to the thick walls required to contain the high pressures, and the energy densities associated with gas storage (even at extreme pressures up to 10,000 psi) are dramatically lower. These two options are typically traded depending on the system requirements, but few practical options exist that provide all the benefits while limiting the downfalls.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present invention are shown and described with respect to the figures presented herein, in which.

DETAILED DESCRIPTION OF THE INVENTION

Figure 1:
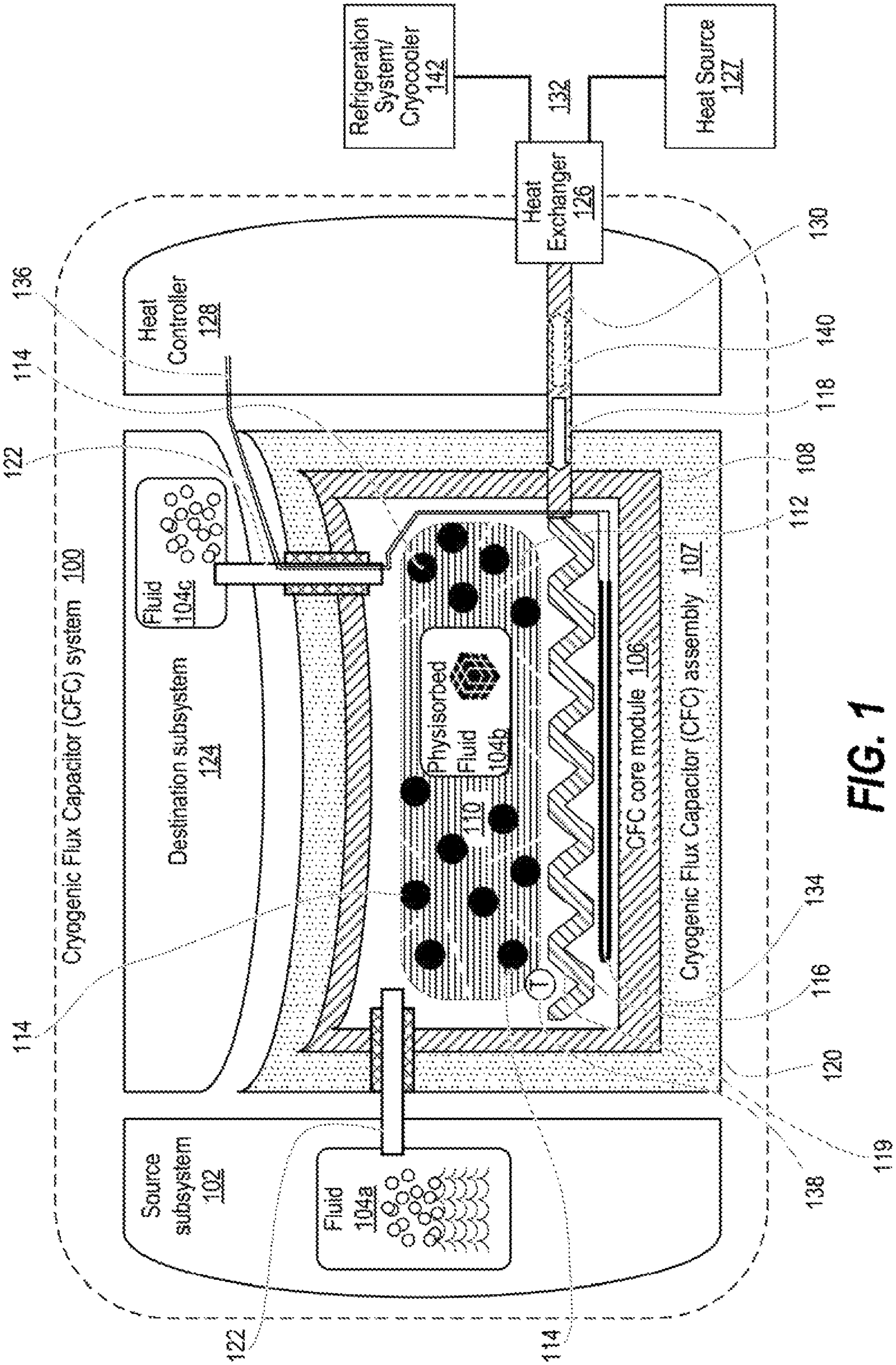
FIG. 1 is a functional block diagram illustrating an example cryogenic flux capacitor (CFC) core module used in a storage system, according to one or more embodiments.

In accordance with the teachings of the present invention, a cryogenic flux capacitor (CFC) assembly includes a CFC core module that primarily relies upon physical adsorption to store fluids at below-ambient temperatures rather than high pressure for solid-state storage and on-demand supply of fluid commodities. The CFC core module must be supplied with "cold power" in order to work for charging and keeping the liquid from being discharged as gas. The CFC core module includes an inner container comprising a selected one of: (i) a vessel; and (ii) a membrane that contains a substrate material. The substrate material has fluid paths to distribute fluid during charging and discharging. Nanoporous media are attached to, or held within, the substrate material to receive the fluid in a gaseous or liquid state via physical adsorption during charging. Charging occurs as the temperature is lowered and, optionally, as the pressure is increased. The CFC core module includes a thermally conductive support layer that maintains a position of the substrate material within the inner container. The thermally conductive support layer conductively distributes thermal energy (heat) within the entire region bounded by the inner container. An outer insulating container encompasses the CFC core module. The CFC assembly includes at least one fluid conduit that directs transfer of at least one of: (i) the fluid in a gaseous or liquid state through the outer insulating container into the CFC core module during charging; and (ii) the fluid in a gaseous state out of the CFC core module and outer insulating container during discharging. The total charging capacity is determined by the type of nanoporous media, the mass of that media, and the final temperature and pressure of the CFC core module. Charging occurs by providing refrigeration to the CFC core module either by a liquid fluid or an external cold source for the rejection of heat.

In accordance with embodiments of the present invention, a CFC storage system includes a source subsystem that provides fluid in a gaseous or liquid state and a destination subsystem that utilizes the fluid in a gaseous state. A CFC core module of the CFC storage system includes a substrate material provided in an inner container comprising a selected one of: (i) a vessel; and (ii) a membrane. The substrate material has fluid paths to exchange the three-dimensional flux of fluid during charging and discharging. Flux is the action or process of flowing in or flowing out, distributing from perhaps one source to a large number of nanopores simultaneously to expedite charging. Nanoporous media is attached to the substrate material to receive the fluid in the liquid state via physical adsorption during charging. A thermally conductive support layer maintains a position of the substrate material within the inner container. The thermally conductive support layer conductively distributes thermal energy within the inner container. The CFC assembly includes an outer insulating container encompassing the CFC core module. The CFC assembly includes at least one fluid conduit that directs transfer of at least one of: (i) the fluid in a gaseous or liquid state through the outer insulating container into the CFC core module during charging; and (ii) the fluid in a gaseous state out of the CFC core module and outer insulating container during discharging.

According to illustrative embodiments of the present invention, a method includes charging a CFC core module with fluid in a gaseous or liquid state via at least one fluid conduit that passes through an outer insulating container into the CFC core module. The CFC core module includes: (i) an inner container comprising a selected one of: (a) a vessel; and (b) a membrane; (ii) a substrate material provided in the inner container and comprising fluid paths to exchange the fluid during charging and discharging; (iii) nanoporous media attached to the substrate material that receives fluid via physical adsorption during charging; and (iv) a thermally conductive support layer that positions the substrate material within the inner container and conductively distributed thermal energy within the inner container. In one or more embodiments, the method includes (i) coupling a conductive transfer member to a refrigeration source; and (ii) transferring thermal energy from a heat exchanger to a refrigeration source to initiate charging. The method includes selectively exposing the CFC core module to a thermal energy heat source by a selected one of: (i) energizing a resistive heater; (ii) coupling a conductive transfer member to a thermally conductive support member to transfer ambient thermal energy; and (iii) transferring thermal energy from a heat exchanger to initiate discharge of the fluid in a gaseous state. The method includes directing the fluid in the gaseous state to a destination subsystem for utilization.

The charging (deposits) of the CFC assembly or the discharging (withdrawals) of the CFC assembly is constituted by a flux of molecules. The charging is by a fluid in the liquid or gaseous phase. The discharging is always a fluid in the gaseous phase. Refrigeration to below-ambient temperatures such as "cryogenic" at 150K, 100K, 80K (e.g., liquid nitrogen), 20K (e.g., liquid hydrogen), etc., is required to achieve higher storage densities (energy densities).

The above presents a general summary of several aspects of the invention in order to provide a basic understanding of at least some aspects of the invention. The above summary contains simplifications, generalizations, and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the invention in a general form as a prelude to the more detailed description that follows. Other systems, methods, functionality, features, and advantages of the claimed subject matter will be or will become apparent to one of ordinary skill in the art upon examination of the following detailed written description.

According to the present invention, a cryogenic flux capacitor (CFC) storage system includes a CFC core module having an inner container comprising a selected one of: (i) a vessel; and (ii) a membrane that contains a substrate material. CFC can also refer to cryogenic fluid capacitor as flux refers to the process of flowing in or flowing out. Fluid pathways within the CFC core module distribute (flux) fluid evenly and through the entire three-dimensional (3D) volume during charging and discharging. Nanoporous media attached to or held within the substrate material receives fluid molecules via physical adsorption during charging. A thermally conductive support layer maintains position of the substrate material within the inner container. The thermally conductive support layer conductively distributes thermal energy (heat) within the inner container for charging to cryogenic temperatures or discharging for fluid supply. An outer insulating system or container encompasses the CFC core module. At least one fluid conduit directs transfers of the fluid in a gaseous or liquid state from a source subsystem into the CFC core module during charging and the fluid in a gaseous state out of the CFC core module during discharging to a destination subsystem that utilizes the fluid in a gaseous state at ambient or below ambient conditions. At least one connection to the CFC core module enables charging by one of the following: (i) supply of cryogenic liquid; (ii) heat rejection solid conduction link connecting to refrigeration source or cryocooler; or (iii) heat exchange loop circulating refrigerated liquid.

In one or more embodiments, moderate or high pressure can be used to augment the capacity as both lower temperature and high pressures will increase the total amount of molecules adsorbed. In one or more embodiments, charging occurs as the temperature is lowered, and optimally, the pressure is increased. The present invention provides that temperatures below ambient are the main objective to create a CFC device that provides an outflow (flux) of molecules which constitute the gaseous fluid supply that is desired. The charging capacity is determined by the type of nanoporous media, mass of that media, and the final temperature and pressure of the system. The fluid supply is a flux of molecules. In one or more embodiments, the fluid supply includes molecules in a liquid state or refrigeration to the CFC core module converts molecules in a gaseous state to a liquid state. The cryogenic temperature imparted to the nanoporous material achieves a density of adsorption. In all embodiments, the discharged fluid supply is in a gaseous state. Because the CFC core module is kept cold until used, the discharged gas is at below-ambient temperatures. This available "cold power" or refrigeration is an option to use. For example, a CFC storage system for a rescue breathing system may benefit from using the cold gas to provide cooling/comfort to the user.

In one or more embodiments, the present invention provides acryogenic flux capacitor for solid-state storage and on-demand supply of gases. Aspects of the present invention provides solutions to a problem in the world today regarding the storage of energy. Renewable energy (solar, wind, geothermal, etc.) abounds, but storage of that energy is a problem. A further problem is the on-demand access of that energy (the "un-storage"). The best energy storage method in the world is not useful if the energy cannot be un-stored in a practical way.

In one or more embodiments, the CFC is a system for the storage (charging) and un-storage (discharging) of energy in a practical utilitarian way. The stored energy in this case is represented by a fluid in a solid-state manner. Solid-state storage means that the fluid is physically bonded within the pores of a meso-porous or nanoporous storage media. The process of bonding or debonding is governed by principles of physical adsorption (physisorption) and thermodynamics. Those skilled in the art may give reference to the book entitled *The Dynamical Character of Adsorption* by Jan Hendrik Boer for details on physisorption.

The field of the present invention includes, but is not limited to, fluid storage/supply devices, energy storage, low-temperature adsorption in materials, and applied energy storage. The present invention is an effective means of transporting a fluid to and from a storage media. The fluid can be liquid or gas coming in and will always be gas coming out. The basic concept is this: fluid in/gas out. There is no problem with liquid behavior such as sloshing or liquid level management because the fluid is stored in a physisorbed state that is not liquid, no matter the density or temperature. The fluid itself can be nitrogen, helium, hydrogen, methane, natural gas, argon, oxygen, or air in many different practical applications. Other potential fluids include anything that can be effectively adsorbed within a porous media.

The present invention can be scaled from small to large or very large without issue. The system can also be fully modular in design and/or operation. The system can be constructed using commercially available materials or may in the future be built using some exotic, higher performance materials under development in research and development (R&D) laboratories worldwide.

Some of the fundamental elements and features of the present invention are briefly described as follows: (i) nanoporous media for physisorption; (ii) below-ambient working temperatures with one or more of: (a) refrigeration provided by the fluid itself, (b) refrigeration provided by mechanical conductive means, or (c) refrigeration provided by a separate refrigeration loop (heat exchanger); (iii) integrated thermo-mechanical fluid delivery system (the "CFC core module"); (iv) an integrated system design of the CFC core module having substrate material that works in continuity for flux of fluid/molecules among three physical scales: nano, micro, and macro; and (v) an integrated system design that provides pathways for molecules to travel and communicate with thermal interaction in the progression from macro to micro to nano (storage) AND in the progression from nano to micro to macro (un-storage).

In summary, CFC core modules use composite materials with an internal fiber matrix network to enable repeatable and constant operation in charging and discharging over the life of the device. The CFC can store large quantities of fluid commodities at moderate pressures in a non-gaseous and non-liquid state (physisorbed state) at below ambient temperatures such as 200K, 100K, 77K, or lower. The lower the temperature is, the higher the energy density (storage capacity). Being the middle ground between the two extremes of low pressure cryogenic liquids and high-pressure gases, the present invention of the CFC presents a host of alternative and enabling applications. Energy storage is not useful unless the energy can be practically obtained ("un-stored") as needed. In the present case, the goal is to store as many fluid molecules as possible in the smallest, lightest weight volume possible AND to supply ("un-store") those molecules on demand as needed in the end-use application. The CFC addresses this dual storage/usage problem with a novel charging/discharging design approach.

When integrated into a system, the CFC can be used to store cryogenic liquids at moderate pressures and then, once energized during operation it provides a continuous, long duration gas supply which can be utilized for various operations (for example, argon for welding or inerting, hydrogen as fuel to an engine or fuel-cell, etc.). In addition, the core idea is extensible to other geometries and embodiments, not just the cylindrical embodiment shown in this application. Since the CFC has the ability to operate at low pressure and without vacuum jacketing, the technology can be exploited for numerous conformal geometries (e.g., for tanks in vehicle compartments or personnel gear). Uses for such implementations includes future replacement of fuel tanks for liquid natural gas (LNG) or liquid hydrogen (LH2) on vehicles including boats or planes. CFC technology enables conformal designs that are not supportable by generally-known tanks that require high pressure or vacuum jacketing to achieve storage.

References within the specification to "one embodiment," "an embodiment," "embodiments," or "one or more embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods, and/or functions herein, without limitation. References to any specific protocol or proprietary name in describing one or more elements, features, or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a cryogenic flux capacitor (CFC) system 100 for solid-state storage of fluid in gaseous or liquid state and on-demand supply of gases. A source subsystem 102 provides fluid 104*a* in a liquid state. An example CFC core module 106 of a CFC assembly 107 includes an inner container 108 that contains a substrate material 110 that has fluid paths 112 to receive the fluid 104*a* during charging. Inner container 108 is a selected one of: (i) a vessel; and (ii) a membrane. In one or more embodiments, substrate material 110 can be fibers or filaments of any number of polymeric microfibers, glass fiber, carbon fiber, or composite or metal filaments that are thermally conductive relative to surrounding nanoporous media. Substrate material 110 can be a nonwoven fabric of such fibers or filaments that provides mechanical support to the surrounding nanoporous media. The fibers or filaments are an integrating link for the system, connecting between the nano-scale and the micro-scale.

Nanoporous media 114 are attached to the substrate material 110 to receive the fluid 104*a* in the gaseous or liquid state into nano-pores via physical adsorption as fluid 104*b* in a physisorbed state. In one or more embodiments, nanoporous media 114 comprise nanoporous media such as silica aerogel within a fiber matrix (e.g., aerogel blanket) with average pore size of 20 nm and bulk density of 130 kg/m$^3$. In one or more embodiments, nanoporous media 114 comprise particles of nanoporous media such as silica aerogel with an average pore size of 25 nm and an average diameter of 1-mm and bulk density of 80 kg/m3. Nanoporous media 114 can be attached as a coating around a portion of substrate material 110, such as around a fiber. Nanoporous media 114 can be attached by being substantially surrounded and contained by substrate material 110, such as within a mat or batting.

By contrast, generally-known monolithic aerogels and other high surface area (>800 m2/g) materials (mostly powders) offer the maximum in storage potential via solid state adsorption; but monoliths do not work in practice due to catastrophic cracking during thermal cycling and/or gas charging/discharging, and powders are severely limited by the means of containment. Similarly, using nanoporous media 114 attached to substrate material 110 overcomes these limitations. Using an aerogel/fiber matrix composite (e.g., aerogel blanket) also overcomes these limitations.

A thermally conductive support layer 116 for thermo-fluid delivery maintains a position of the substrate material 110 within the inner container 108. For example, the thermally conductive support layer 116 can impose geometric-based embodiments such as: (i) coiled cylinder; (ii) a parallel plate, any shape; and (iii) conformal/non-symmetric. The thermally conductive support layer 116 conductively distributes in-bound thermal energy 118 within the inner container 108. The thermally conductive support layer comprises a channeled surface 119 such as corrugations to facilitate fluid movement. In one or more embodiments, thermally conductive support layer 116 comprises one or more conductive elements of disks or foils, in either mesh or membrane forms, and composed of any metal or composite material. Geometries of the conductive elements are selected from spiral, parallel plate, or conformal types. Further features of the conductive elements may or may not include three-dimensional attributes such as corrugations, weaves, or embossing. The conductive element is the primary integrating link for the system, connecting between the micro-scale and the macro-scale. The external heat to be applied for system operation is communicated through the conductive element and thus into the nanoporous media.

An outer insulating container 120 encompasses the CFC core module 106. Outer insulating container 120 with application equipment can be configured per specific application with any variation on the following approaches: (i) container could be simple mechanical insulation (non-pressurized, ambient pressure); (ii) container could be simple mechanical insulation (pressurized); (iii) container could be vacuum-jacketed (non-pressurized, ambient pressure); and (iv) container could be vacuum jacketed pressure vessel (pressurized). Physical orientation of outer insulating container 120 is independent, in gravity or zero-gravity environments. Outer insulating container 120 can be conformally shaped to mount to a selected one of: (i) a concave surface; and (ii) a convex surface.

At least one fluid conduit 122 directs transfer of at least one of: (i) the fluid 104*a* in a liquid state through the outer insulating container 120 into the CFC core module 106 during charging from the source subsystem 102; and (ii) fluid 104*c* in a gaseous state out of the CFC core module 106 and outer insulating container 120 during discharging to a destination subsystem 124. In one or more embodiments, fluid conduits 122 (one or more) can comprise any number of design configurations to meet specific application requirements in concert with the container and ancillary equipment needs. For example, a method of charging the system (i.e., storing the fluid) can include suppling liquid directly to the nanoporous media 114 by either direct submersion or inflow or pouring. Charging the system can also include flowing in gas and cooling the conductive element via refrigeration (either conductively or via a refrigerant flow loop) and exposing the nanoporous media to a desired gas source. For example, a conductive heat exchanger 126 can be coupled through the outer insulating container 120 to at least one of: (i) decrease the cryogenic temperature within the substrate material 110 to extend storage of the physically adsorbed fluid 104*b*; and (ii) increase the cryogenic temperature within the substrate material 110 to initiate discharging of the fluid 104*c* in gaseous state.

One or more controlled or uncontrolled heating mechanisms can be incorporated to provide in-bound thermal energy 118 to the CFO core module 106 to initiate or adjust a rate of discharge of fluid 104*c* in a gaseous state. Method of supplying the heat can include receiving in-bound thermal energy 118 (heat) from a heat source 127 that is a selected one of: (i) resistive heater (electrical); (ii) environmental heat ingress; and (iii) separate fluid heat exchanger. These methods are illustrated by a heat controller 128 that warms the fluid 104*a* at least partially to a gaseous state prior to entering the at least one fluid path to warm fluid 104*b* physically adsorbed by nanoporous media 114 of nanoporous material to initiate discharge of fluid 104*c* in a gaseous state. Alternatively, or in addition, a conductive transfer member 130 is thermally coupled to the thermally conductive support layer 116 and extending externally to the outer insulating container 120 to receive environmental heat energy 132 to initiate discharging of the fluid 104*c* in the gaseous state. Alternatively, or in addition, a resistive heater element 134 is positioned within the outer insulating container 120 and connectable to the heat controller 128 via electrical conductors 136 that pass through the outer insulating container 120. Temperature thermocouples 138 positioned at various points within the inner container 108 can be used by the heat controller 128 to determine an amount of charge remaining and/or a rate of discharging. In one or more embodiments, fluid 104*a* is at least in part in a gaseous state during charging or extended shelf-life of CFC system 100. Such fluid 104*a* which is at least in part in a gaseous state requires cooling to become physisorbed fluid 104*b*. Outbound thermal energy 140 can be relayed via conductive heat exchanger 126 to a refrigeration system or cryocooler 142.

The CFC storage system 100 includes a destination subsystem 124 that utilizes the fluid 104*c* in a gaseous state. Although not an all-inclusive list, a number of listed embodiments for the present invention illustrate universal and generic purpose of a practical and efficient system to provide "fluid in" and "gas out" for energy storage applications of all kinds. Destination subsystem 124 can represent application-based embodiments for fluids such as: (i) fuels (hydrogen, natural gas, methane, etc.); (ii) oxidizers (oxygen, air, etc.); (iii) welding gas (argon, helium, etc.); (iv) purge gas (nitrogen, argon, etc.); (v) reactant gas (chemical processes); (vi) carrier gas (helium, etc.); (vii) calibrated sample gas; and (viii) refrigerant gas. Destination subsystem 124 can represent application-based embodiments further including: (a) life support (oxygen or breathing air); (b) cold-power (used specifically for refrigeration or cooling); and (c) electricity production. With regard to the latter, thermal energy storage for power plants is supported (e.g., liquid air storage during times when electrical production exceeds demand). This energy storage is scalable from large-grid to micro-grid to end-user size storage. Electricity production includes thermoelectric production concurrent with gas supply function (dual function). Specific use cases of a destination subsystem 124 include: (a) breathing air rescue packs; (b) cryogenic propellant storage for satellites; (c) cold-chain shipping coolers; (d) fuel pods for cube satellites, forklifts, and construction equipment; (e) oxygen packs for respiratory patients; (f) portable welding equipment; (g) long duration, heavy lift hydrogen-powered fuel-cell drones; and (h) tactical Joule-Thomson (JT) cryocooler for sensing devices.

System design-based embodiment with integration of thermo-fluid requirements can be scaled an optimized with any combination of the options to accommodate: (a) Capacity (physical size or modular approach); and (b) Dormancy (shelf-life, storage time, etc.) such as including: (i) Mechanical insulation (symmetric or conformal shapes); (ii) Vacuum-jacketed, high performance insulation system (cylindered or spherical only); or (iii) Working pressure: no pressure (ambient) to high pressure (>100 bar).

Figure 2A:
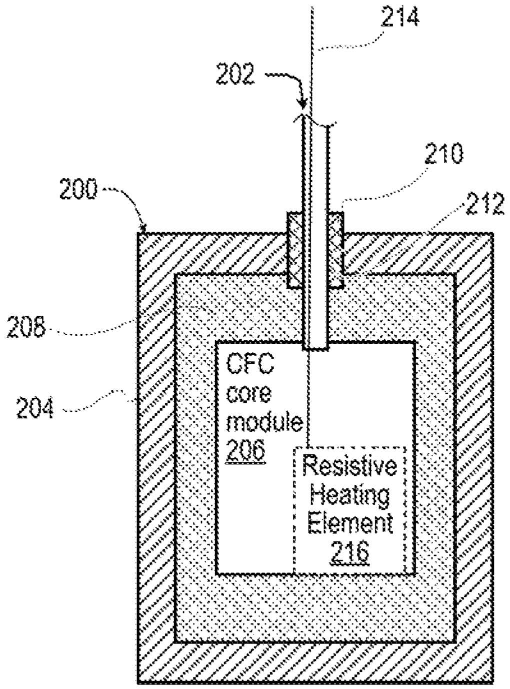
FIG. 2A is a simplified side cross-sectional diagram illustrating an example CFC core module having a top-mounted single tube process control assembly, according to one or more embodiments.

FIG. 2A is a simplified side cross-sectional diagram illustrating an example CFC assembly 200 having a top-mounted single tube process control assembly 202, according to one or more embodiments. Top-mounted single tube process control assembly 202 enables liquid-in and/or gas-in charging and enables gas-out discharging. For example, CFC assembly 200 can be used for a liquid oxygen supply as well as for other purposes. An insulative envelope or container 204 can be vacuum jacketed or just consist of mechanical insulation in any shape or form to surround a CFC core module 206. Intermediary material 208 such as fiberglass or other conformable insulation is placed between the insulative envelope or container 204 and the CFC core module 206 for thermal protection and for particle filtration. A low thermal conductivity isolator or thermal break 210 surrounds the top-mounted single tube process control assembly 202 in an opening 212 in the insulative envelope or container 204. Thermal break 210 provides temperature isolation between a temperature environment of the CFC core module 206 and an ambient temperature environment. Lead wires 214 can pass through thermal break 210 or through top-mounted single tube process control assembly 202 to activate a resistive heating element 216 within or proximate to CFC core module 206. Resistive heating element 216 is not activated during periods of dormancy/storage and is activated to control discharge of gas.

Figure 2B:
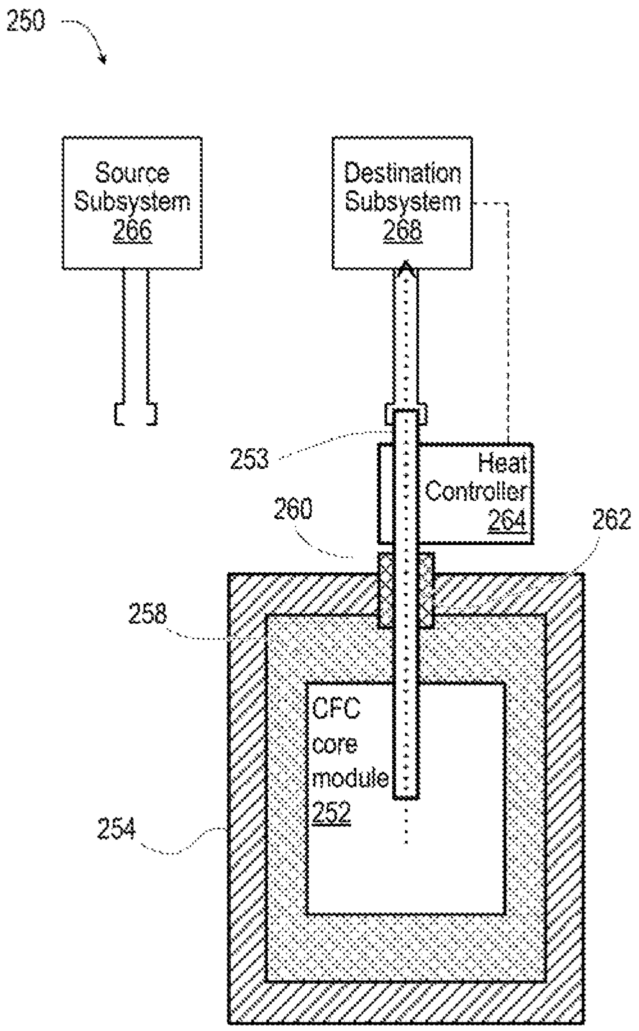
FIG. 2B is a simplified side cross-sectional diagram illustrating an example CFC core module having a top-mounted process control assembly for gas supply, according to one or more embodiments.

FIG. 2B is a simplified side cross-sectional diagram illustrating an example CFC assembly 250 having a CFC core module 252 having a top-mounted process control assembly 253 for gas supply, according to one or more embodiments. For example, CFC assembly 250 can be used for a portable liquid oxygen supply as well as for other purposes. An insulative envelope or container 254 can be vacuum jacketed or just consist of mechanical insulation in any shape or form to surround the CFC core module 252. Vacuum jacketing can be done with a spherical or cylinder shape to accommodate high pressure levels. Optional intermediary material 258 such as fiberglass or other conformable insulation is placed between the insulative envelope or container 254 and the CFC core module 256 for thermal protection and for particle filtration. A low heat leak coupling/interface 260 surrounds the top-mounted single tube process control assembly 252 in an opening 262 in the insulative envelope or container 254. Top-mounted process control assembly 253 conducts thermal energy from an ambient environment or from a heat controller 264 to initiate discharge. CFC assembly 250 can be scaled to the size of a building or as small as a thimble according to the application. In one or more embodiments, top-mounted single tube process control assembly 253 is engagably coupled to a source subsystem 266 for charging, disconnected for storage, and engagably coupled to a destination subsystem 268 during discharge.

Figure 3:
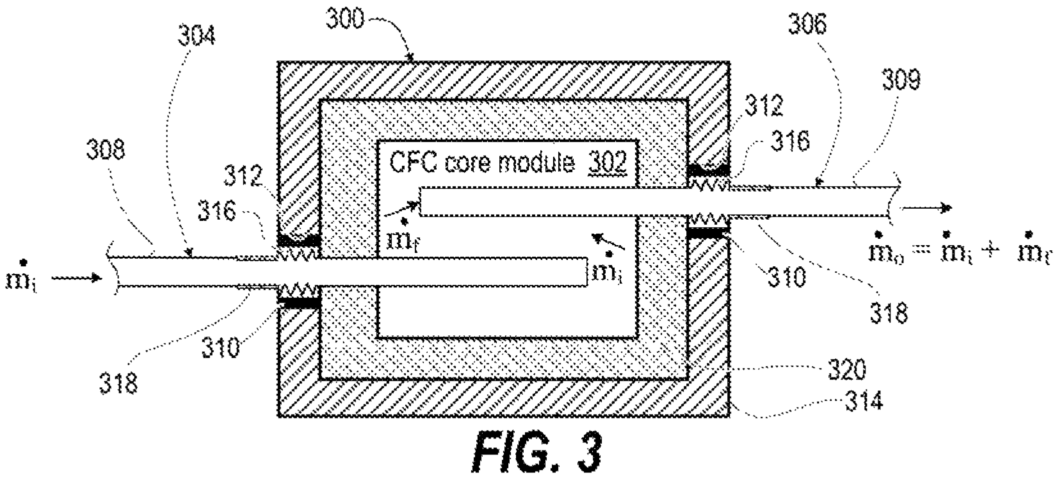
FIG. 3 is a simplified side cross-sectional diagram illustrating an example CFC core module having dual opposing side-mounted tube process control assemblies, according to one or more embodiments.

FIG. 3 is a simplified side cross-sectional diagram illustrating a CFC assembly 300 with an example CFC core module 302 having dual opposing side-mounted tube process control assemblies 304, 306, according to one or more embodiments. Input tube process control assembly 304 has an input tube 308 that provides fluid management for (liquid or gas) mass in ($\dot{m}_i$) flow. Output tube process control assembly 306 has an output tube 309 that provides fluid management for (gas) mass out ($\dot{m}_o$) flow. Each tube process control assembly 304, 306 includes a low thermal conductivity isolator or thermal break 310 surrounding the respective tube 308, 309 in an opening 312 in an insulative envelope or container 314. Tubes 308, 309 include a thin corrugated metal bellows 316 and/or a low thermal conductivity composite section 318 to provide temperature isolation between a temperature environment of the CFC core module 302 and an ambient temperature environment. Intermediary material 320 such as fiberglass or other conformable insulation is placed between the insulative envelope or container 314 and the CFC core module 302 for thermal protection and for particle filtration. Temperature changes within the CFC core module 302 caused by mass in ($\dot{m}_i$) flow, mass out ($\dot{m}_o$) flow, as well as any concurrent thermal energy (heat) transfers cause a mass flux ($\dot{m}_f$) flow either into or out of a state. Thus, mass out ($\dot{m}_o$) flow equals mass in ($\dot{m}_i$) flow plus mass flux ($\overline{m}_f$) flow, the latter being a negative (charging), zero (storage), or positive (discharging) value.

Figure 4:
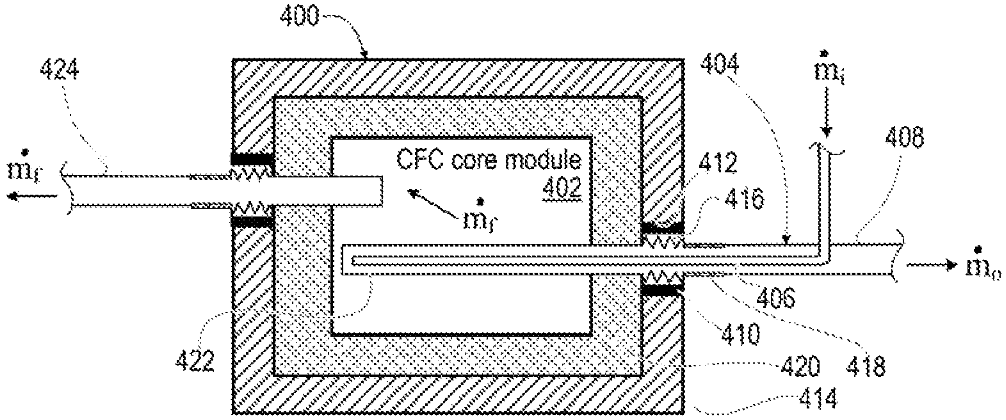
FIG. 4 is a simplified side cross-sectional diagram illustrating an example CFC core module having a side-mounted tube-in-tube process control assembly, according to one or more embodiments.

FIG. 4 is a simplified side cross-sectional diagram illustrating an example CFC assembly 400 having a CFC core module 402 with a side-mounted tube-in-tube process control assembly 404, according to one or more embodiments. Side-mounted tube-in-tube process control assembly 404 provides temperature control for CFC core module 402 and includes an inner tube 406 for (liquid or gas) mass in ($\dot{m}_i$) flow, an outer tube 408 for (gas) mass out ($\dot{m}_o$) flow. A low thermal conductivity isolator or thermal break 410 surrounds the side-mounted tube-in-tube process control assembly 404 in an opening 412 in an insulative envelope or container 414. Outer tube 408 includes a thin corrugated metal bellows 416 and/or a low thermal conductivity composite section 418 to provide temperature isolation between a temperature environment of the CFC core module 402 and an ambient temperature environment. Intermediary material 420 such as fiberglass or other conformable insulation is placed between the insulative envelope or container 414 and the CFC core module 402 for thermal protection and for particle filtration. Internally disposed portion 422 of outer tube 408 conducts thermal energy (heat) for exchange with mass in ($\dot{m}_i$) flow for selectively cooling for charging, maintaining an internal temperature for storage, or for warming for discharge. Discharge tube 424 provides fluid management for mass flux ($\dot{m}_f$) flow for molecules physiosorbed in CFC core module 402, which can be a different chemical molecule than what is used for temperature control in side-mounted tube-in-tube process control assembly 404. Discharge tube 424 exhausts positive mass flux ($\dot{m}_f$) during discharge. In one or more embodiments, discharge tube 424 receives fluid in either gas or liquid state during charging (i.e., a negative mass flux ($\dot{m}_f$)).

Figure 5:
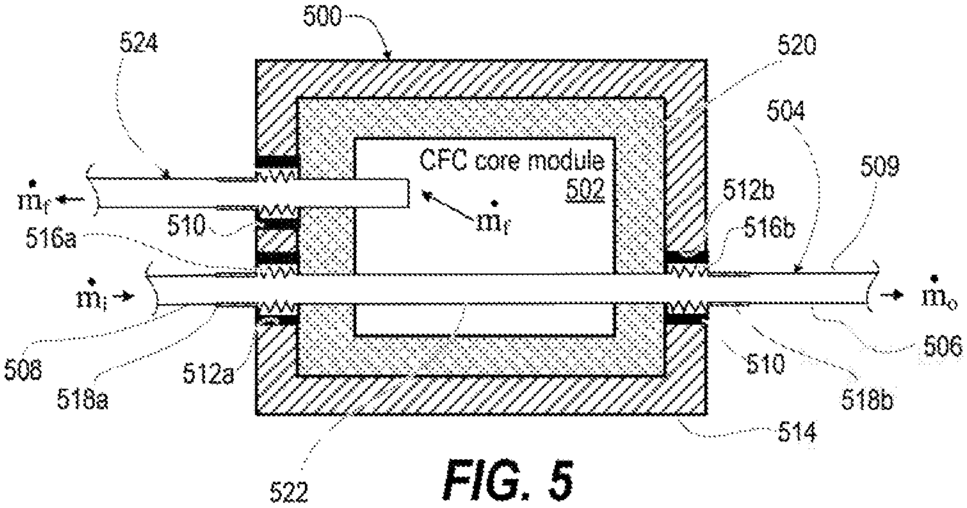
FIG. 5 is a simplified side cross-sectional diagram illustrating an example CFC core module having a pass-through flow tube, according to one or more embodiments.

FIG. 5 is a simplified side cross-sectional diagram illustrating an example CFC assembly 500 having a CFC core module 502 with a pass-through tube process control assembly 504, according to one or more embodiments. Pass-through tube process control assembly 504 provides temperature control for CFC core module 502. Pass-through tube process control assembly 504 includes a pass-through tube 506 for (liquid or gas) mass in ($\dot{m}_i$) flow at a first end 508 and a second end 509 for (gas) mass out ($\dot{m}_o$) flow. A low thermal conductivity isolator or thermal break 510 surrounds the pass-through tube 506 in each respective opening 512*a*, 512*b* in an insulative envelope or container 514. Pass-through tube 506 includes a thin corrugated metal bellows 516*a*, 516*b* and/or a low thermal conductivity composite section 518*a*, 518*b* to provide temperature isolation between a temperature environment of the CFC core module 502 and an ambient temperature environment. Intermediary material 520 such as fiberglass or other conformable insulation is placed between the insulative envelope or container 514 and the CFC core module 502 for thermal protection and for particle filtration. Internally disposed portion 522 of pass-through tube 506 conducts thermal energy (heat) for exchange with mass in ($\dot{m}_i$) flow for selectively cooling for charging, maintaining an internal temperature for storage, or for warming for discharge. Discharge tube 524 provides fluid management for mass flux ($\dot{m}_f$) flow for molecules physiosorbed in CFC core module 502, which can be a different chemical molecule than what is used for temperature control in pass-through tube process control assembly 504. Discharge tube 524 exhausts positive mass flux ($\dot{m}_f$) during discharge. In one or more embodiments, discharge tube 524 receives fluid in either gas or liquid state during charging (i.e., a negative mass flux ($\dot{m}_f$)).

Figure 6A:
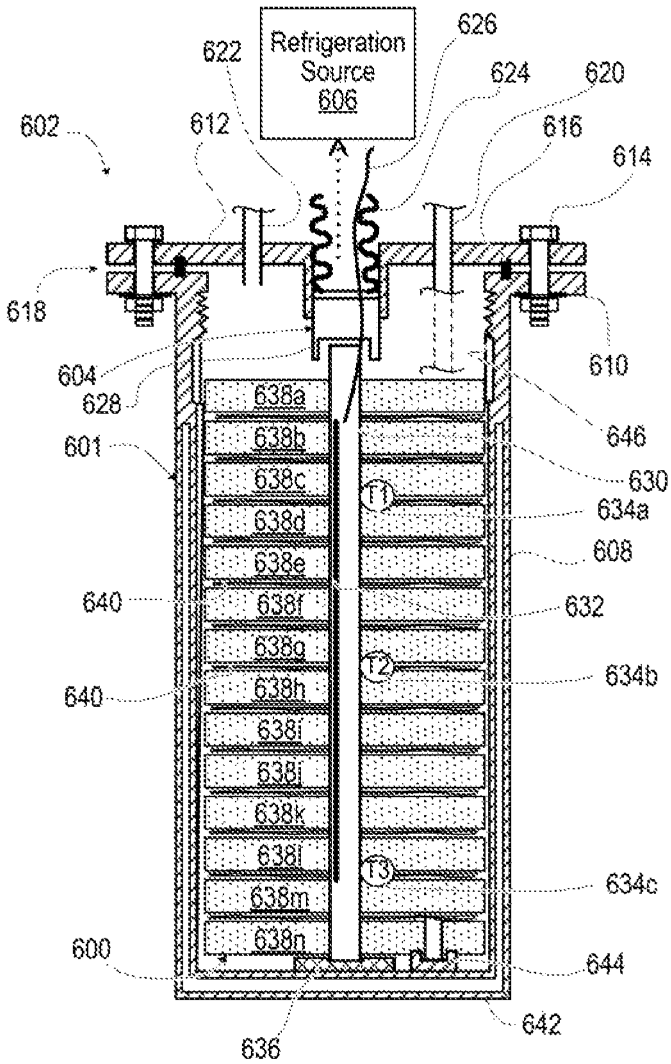
FIG. 6A is a simplified side cross-sectional diagram illustrating an example CFC core module having a top-mounted center core process control assembly with a stacked parallel plate design, according to one or more embodiments.

FIG. 6A is a simplified side cross-sectional diagram illustrating an example CFC core module 600 inserted within a vacuum jacketed insulated container 601 to form a fluid supply system 602. Fluid supply system 602 has a top-mounted center core process control assembly 604 with a stacked parallel plate design, according to one or more embodiments. For example, the top-mounted center core process control assembly 604 can charge from or discharge to a refrigeration source 606. Vacuum jacketed insulated container 601 includes a bottom cylinder 608 with a top annular flange 610 closed by a top disk-shaped lid 612. Fasteners 614 can cause a static ring seal 616 between the top annular flange 610 and the top disk-shaped lid 612 to seal and form the mounting flange assembly 618. Alternatively, a charging station (not shown) can provide a fastening force to the top annular flange 610 and the top disk-shaped lid 612 that combine to also form a mounting flange assembly 618. In addition to the top-mounted center core process control assembly 604 passing through top disk-shaped lid 612, a port "A" 620 can provide a gas in/out tube, which can be used for an optional cryofil funnel stick. In addition, a port "B" 622 can serve as a reload/purge/auxiliary port.

The top-mounted center core process control assembly 604 can include a low thermally conductive tube such as thin metal bellows tube 624 that extends externally to couple with the refrigeration source 606 and seats within at least one thermal switch assembly 628. Thin metal bellows tube 624 has less thermal conductivity because the walls are thinner than standard tubes, presenting less cross-sectional area to conduct thermal energy. In addition, the inward and outward corrugations of the thin metal bellows tube 624 present a longer thermal conduction path, reducing the amount of thermal energy that leaves CFC core module 600 via the thin metal bellows tube 624. Lead wires 626 pass through the bellows tube 624, a thermal switch assembly 628, and into a core conduction tube 630 to electrically connect to an optional electrical heater 632 and temperature sensors T1-T3 634*a*-*c*. The core conduction tube 630 rests on a tube bearing 636 formed of X-aerogel. The stacked parallel plate design includes cryo adsorption disks 638*a*-*n*. For example, cryo adsorption disks 638*a*-*n* can be formed from 10 mm cryogel aerogel composite. Perforated conduction disks 640 are placed between each pair of cryo adsorption disks 638*a*-*n*. Perforated conduction disks 640, such as formed from copper foil, have a center opening that is pressed onto the core conduction tube 630 to provide a thermal conduction path. Between each adjacent pair of the top five cryo adsorption disks 638*a*-*e*, one perforated conduction disk 640 is placed. Between each pair of the middle five adsorption disks 638*e*-*i*, two perforated conduction disks 640 are placed. Between each pair of the bottom six adsorption disks 638*i*-*n*, three perforated conduction disks 640 are placed. Alternatively, thicker conduction disks can be used. This variation provides a conduction balanced design. Additional numbers or thickness of conduction disks 640 supports a greater rate of discharge.

At a base 642 of the bottom cylinder 608, a particle filter 644 can be placed of sintered bronze. A thermal break and metal bellows feature 646 around an upper portion of the bottom cylinder 608 can reduce thermal conduction to the top disk-shaped lid 612.

Figure 6B:
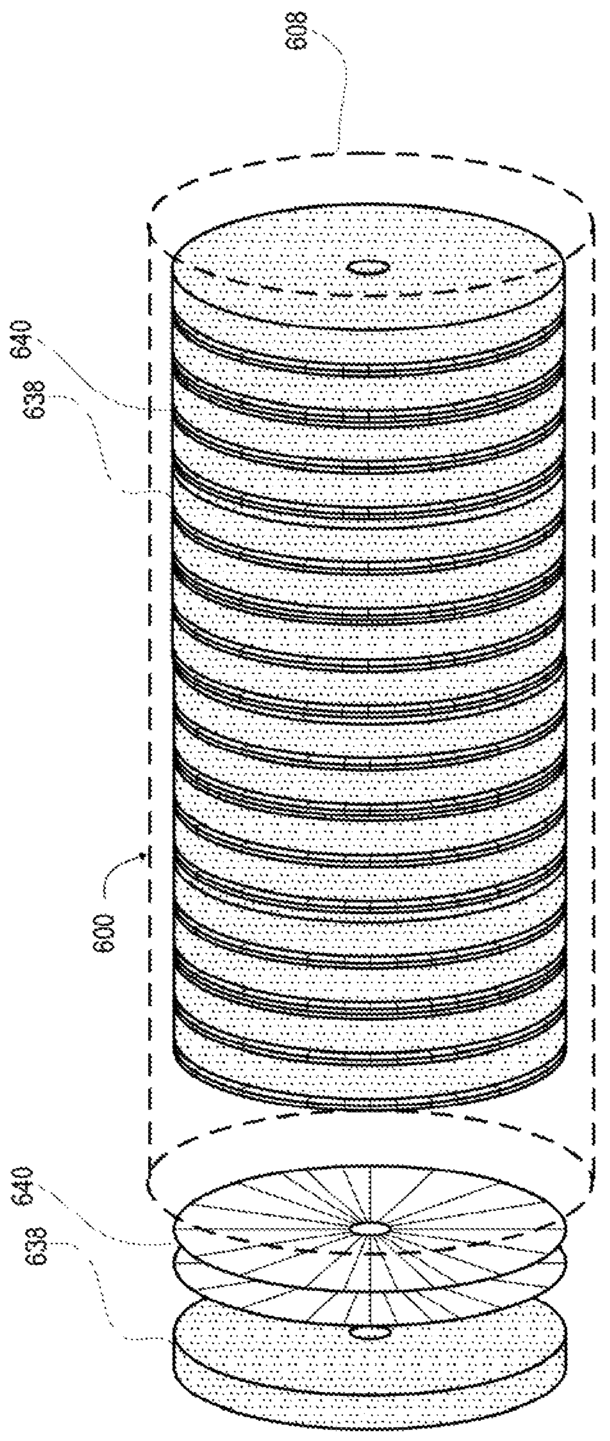
FIG. 6B is an isometric view partially disassembled of an example flat plate CFC core module, according to one or more embodiments.

FIG. 6B is an isometric view partially disassembled of an example flat plate CFC core module 600 of FIG. 6A during initial assembly of cryo adsorption disks 638 respectively separated by perforated conduction disks 640 within bottom cylinder 608 (illustrated in phantom).

Figure 7:
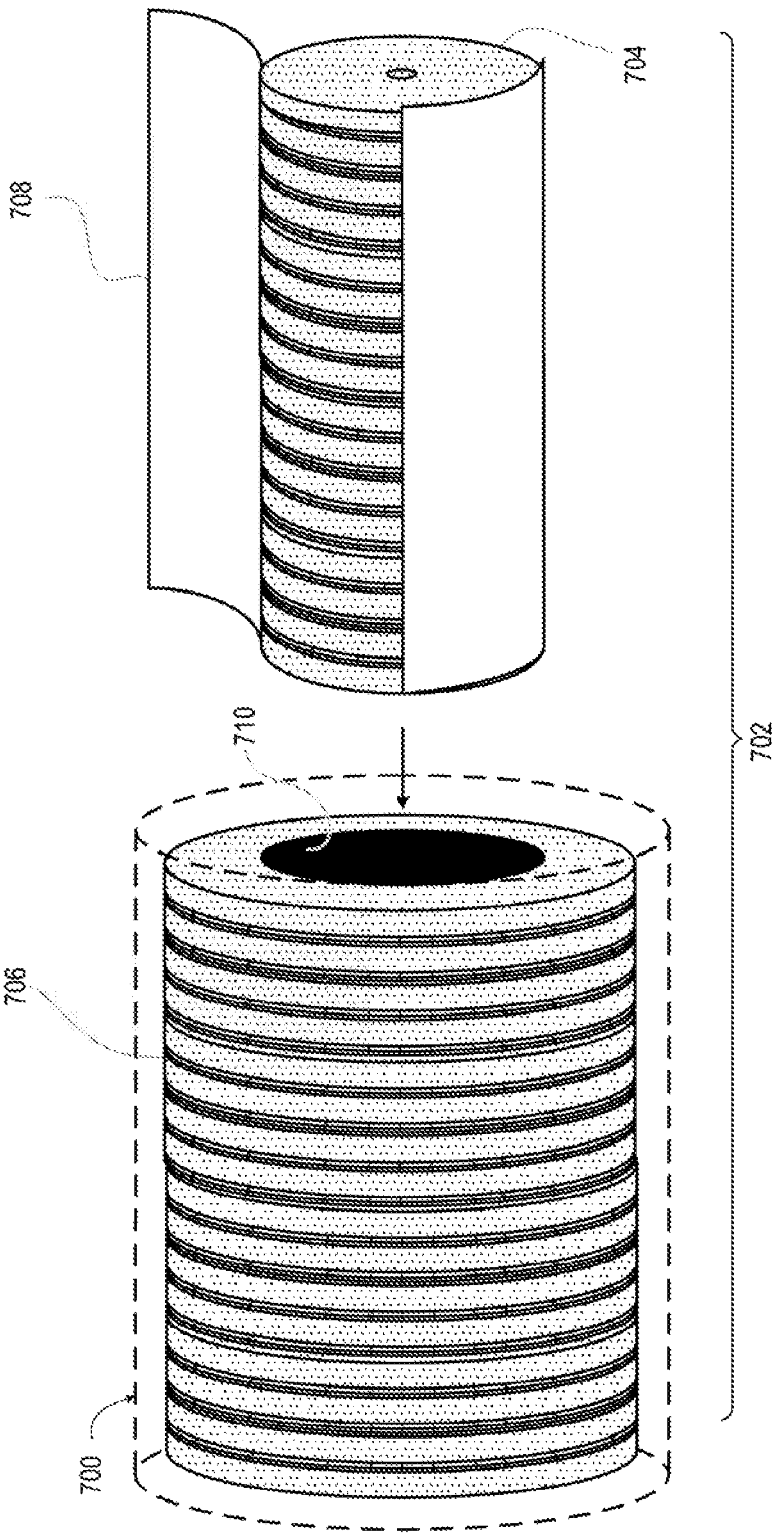
FIG. 7 is an isometric view partially disassembled of an example flat plate CFC core module having a stacked layer separated into an inner nested portion and an outer surrounding portion separated by an isolation layer, according to one or more embodiments.

FIG. 7 is an isometric view partially disassembled of an example flat plate CFC core module 700 having a stacked layer 702 that is separated into an inner nested portion 704 and an outer surrounding portion 706. Inner nested portion 704 is encased in isolation layer 708 that separates inner nested portion 704 from outer surrounding portion 706. Isolation layer 708 can serve one or more of the following functions: (i) provide structural support to the inner nested portion 704 to facilitate assembly; (ii) provide an impermeable barrier to liquid and/or gas flow; (iii) create an insulative layer; (iv) distribute thermal energy between individual stacks; (v) provide a mounting surface for temperature thermocouples; etc. For clarity, cylindrically shaped stacked layer 702 has a cylindrical opening 710 formed in outer surrounding portion 706 that closely receives inner nested portion 704, although other shapes can be used. In addition, an inner nested portion can be surrounded on all sides by an outer surrounding portion.

Figure 8:
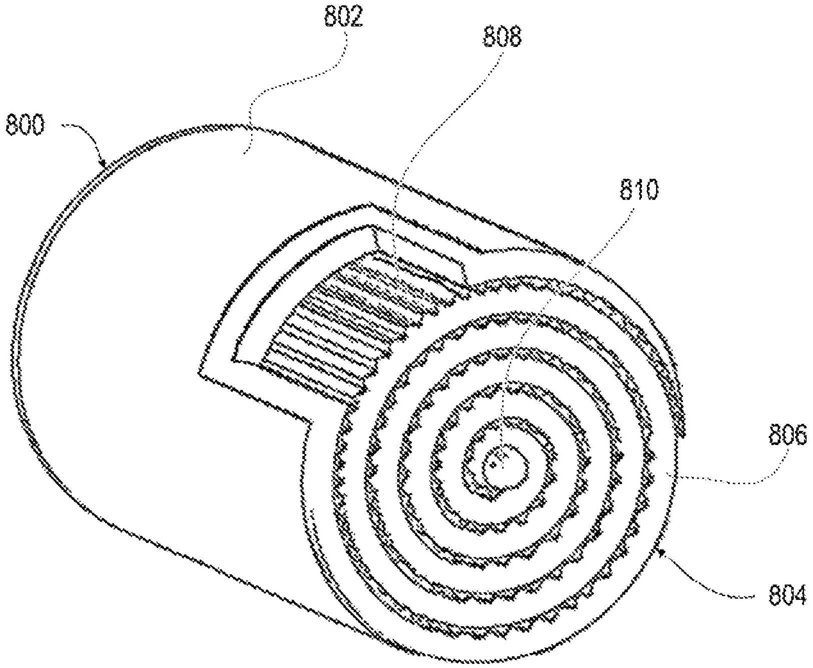
FIG. 8 is an isometric view partially cutaway of a first example spiral coil CFC core module, according to one or more embodiments.

FIG. 8 is an isometric view partially cutaway of a first example spiral coil CFC core module 800, according to one or more embodiments. An optional protective/binding layer 802 surrounds a jelly-rolled composite coil 804. Optional protective/binding layer 802 binds the jelly-rolled composite coil 804, providing overall strength and geometric stability to the unit, as well as environmental protection. Component may or may not be necessary depending on functional requirements. The optional protective/binding layer 802 can be constructed of, and bound by, any material(s) suitable for cryogenic temperatures, and the required fluid commodity. The jelly-rolled composite coil 804 is made of an aerogel blanket sheet 806 and a corrugated thermo-fluid delivery coil 808 that serves as a thermally conductive support layer. Aerogel blanket sheet 806 is commercially available or custom-made of any thickness and cut to required dimensions and coiled. Corrugated thermo-fluid delivery coil 808 is comprised of thin thermally conductive sheet material (e.g., copper, aluminum, etc.), so shaped (e.g, corrugated) as to form axial fluid flow channels when coiled up with aerogel blanket sheet 806. Sheet material may or may not be fluid permeable (e.g., mesh or screen). Corrugated thermo-fluid delivery coil 808 may or may not consist of multiple elements such as: resistive heaters, numerous fluid flow layers and/or barriers (i.e., pressure boundaries), heating/cooling layers, thermal insulating layers, and electrical insulating/conducting layers. Corrugated thermo-fluid delivery coil 808 may also extend around the outer circumference of the CFC core module 800 (not shown) immediately beneath the optional protective/binding layer 802 depending on functional requirements.

In one or more embodiments, an optional center resistive heater 810 is in direct thermal contact with corrugated thermo-fluid delivery coil 808, positioned at the center of the CFC core module 800. Component may or may not be necessary depending on functional requirements. Material may or may not be fluid permeable and/or thermally conductive/insulative.

Figure 9:
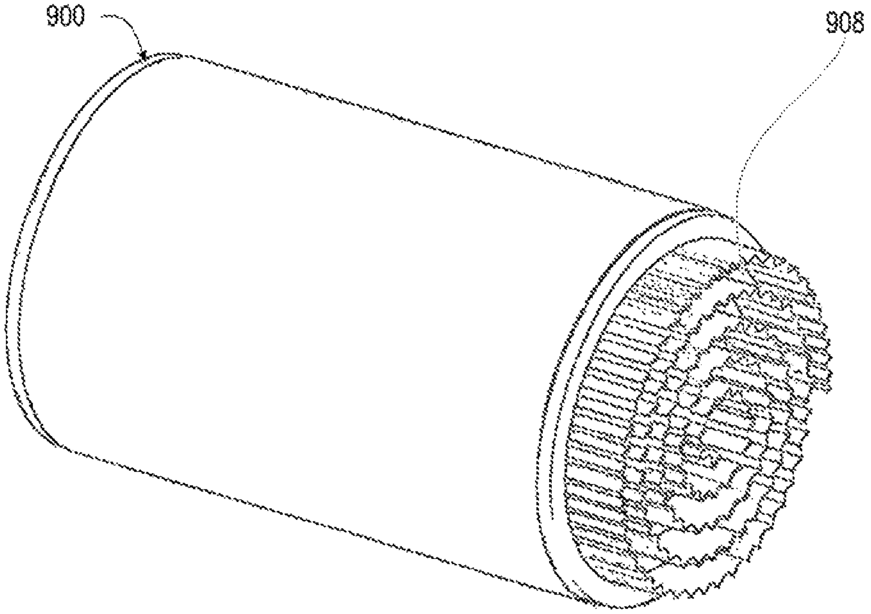
FIG. 9 is an isometric view of a second example spiral coil CFC core module having an extended thermo-fluid delivery coil, according to one or more embodiments.

FIG. 9 is an isometric view of a second example spiral coil CFC core module 900 that is similar to the CFC core module 800 of FIG. 8 but having an extended thermo-fluid delivery coil 908, according to one or more embodiments. The extended thermo-fluid delivery coil 908 provides a thermal link to an external cooling and/or heating source (e.g., a cryocooler).

Figure 10:
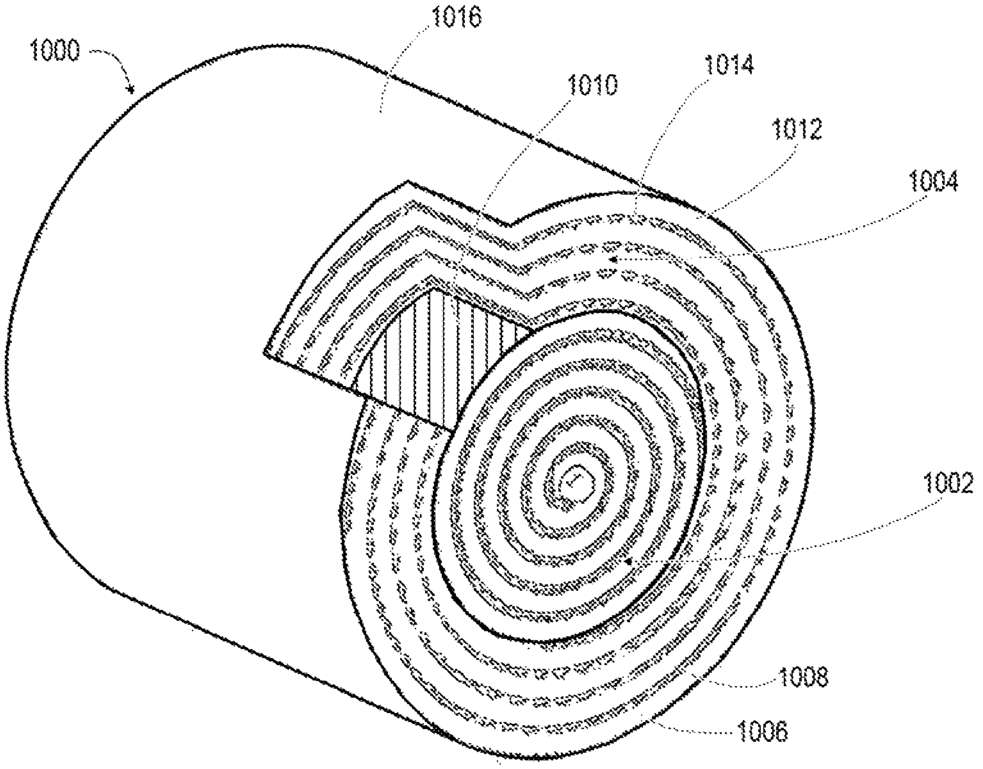
FIG. 10 is an isometric view of a third example spiral coil CFC core module having a nested coil within an outer coil, according to one or more embodiments.

FIG. 10 is an isometric view of a third example spiral coil CFC core module 1000 having a nested coil 1002 within an outer coil 1004, according to one or more embodiments. The nested coil 1002 is made of an aerogel blanket sheet 1006 and a corrugated thermo-fluid delivery coil 1008 that serves as a thermally conductive support layer. Inner protective/binding layer 1010 binds the nested coil 1002, The outer coil 1004 is made of an aerogel blanket sheet 1012 and a corrugated thermo-fluid delivery coil 1014 that serves as a thermally conductive support layer. Outer protective/binding layer 1016 binds the outer coil 1004, providing overall strength and geometric stability to the unit, as well as environmental protection.

The components listed above, along with their respective functionalities and/or configurations, comprise the primary CFC technology. A large number of possible configurations can be derived from this primary technology, extendable to a wide range of possible applications. One such subset of possible configurations is to isolate individual CFC cores (i.e., the aerogel blanket and thermo-fluid delivery coil combination, along with their respective heating elements) using multiple protective/binding layers. Depending on the intended use, the individual protective/binding layers can be designed to thermally isolate the cores (i.e., insulate them from one another), or it can be used to prevent fluid transfer between them. There is no limit to the number of individual cores that can be nested, and such a configuration allows for greater system design flexibility and increased control over the fluid discharge.

Cryogenic Flux Capacitor (CFC) Prototype Overview: Six different CFC prototypes of a "spiral coil" type design were fabricated and tested. Each CFC prototype used aerogel blankets with spiraled fluid flow channel features and integrated heaters. The flow features (built from high conductivity metal (aluminum or copper) sheets or mesh that are corrugated to create flow channels) allow the cryogenic fluid commodity to easily permeate the entire aerogel blanket coil and quickly reach 100% storage capacity quickly. This metallic spiral also acts as a heat exchanger to distribute the energy from a heating element throughout the entire CFC core in order to "discharge" the device (i.e., motivate the cold fluid commodity to come out of the aerogel) or can be interfaced to a cooling source such as a cryocooler to "charge-up" the CFC with gas over time. Most of the CFC units have an outer cover of heat shrink material. This eliminates the need for binding wires while still creating a tight coil and provides a more uniform surface with which the CFC can be secured into a final system.

TABLE 1

CFC Prototype Properties

| CFC | Description | Aerogel Mass (g) |
|---|---|---|
| BL | NOT A CFC, Plain aerogel blanket, 9' × 2" × 10 mm thick blanket strip | 19 |
| CU01 | 8.4" long × 2" diameter × 10 mm thick blanket strip, corrugated copper mesh only in center coil, without outer heat shrink cover | 14 |
| CU02 | 8.4" long × 2" diameter × 10 mm thick blanket strip, corrugated copper mesh only in center coil, with black outer heat shrink cover | 14 |
| CU03 | 9.5" long × 2" diameter × 10 mm thick blanket strip, completely encapsulated in corrugated copper mesh, with black outer heat shrink cover | 16 |
| AL01 | 4.5" long × 3.25" diameter, completely encapsulated in corrugated aluminum mesh, with center cartridge heater and clear outer heat shrink cover | 95 |
| AL02 | 6.25" long × 2.5" diameter, single 0.005" aluminum sheet with 75% corrugation only in center coil, strip heater spiraled around non-corrugated section inside of blanket at one elevation. | 73 |
| AL03 | 4" long × 3.25" diameter, back-to-back aluminum mesh (1 corrugated, 1 flat) only in center coil, strip heater positioned diagonally across flat mesh. | 60 |

The following data definitively prove that the two key design features of the CFC concept are valid. First, that the unit can be "charged up" with fluid commodity extremely fast by exploiting a novel, integrated fluid distribution network. And second, that the network can also be used to facilitate steady, on-demand "discharging" of the CFC by distributing heat from an integrated heating element.

For the CFC Charging Test, two strips of aerogel blanket, both of equal mass and dimensions (roughly 9" long×2" wide×10 mm thick, and weighing approximately 20 g), were cut from a larger overall section. One was rolled up into a "spiral coil" with no CFC modifications included (i.e., a plain rolled-up aerogel blanket cylinder), while the other was rolled up with CFC features (i.e., corrugated fluid flow channels). Also included in each test sample were three type-E thermocouples. One each placed in the center, mid-way, and at the outer surface of the spiral coil. These sensors were used to determine when the spiral coil became completely saturated with liquid nitrogen (i.e., when the sample was 100% "charged").

A small open-atmosphere cryogenic flask was filled with normal boiling point LN2 and the three thermocouples connected to a hand-held data recorder. Once the flask was cooled down and the liquid was stable, data recording was initiated, and the selected spiral coil sample was completely submerged. Each sample was kept submerged until the center-most thermocouple read the same as the liquid temperature (roughly 77 K). Once this condition was reached the sample was considered to be 100% charged and the test concluded.

Figure 11:
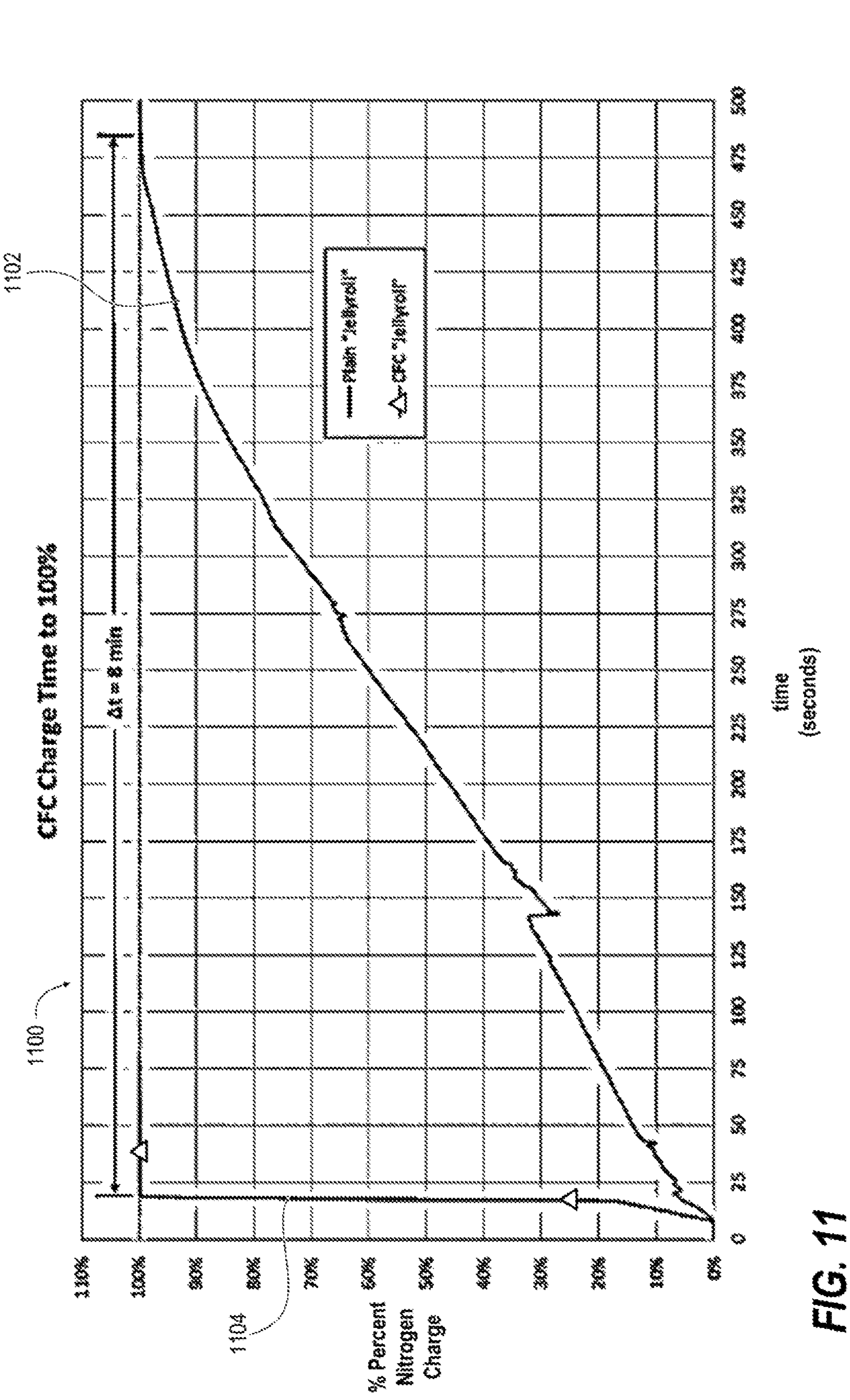
FIG. 11 is a graphical plot of time-to-charge comparison between a generally-known plain spiral coil of aerogel impregnated aerogel blanket versus a spiral coil CFC core module, according to one or more embodiments.

FIG. 11 is a graphical plot 1100 of time-to-charge comparison between a first plot 1102 of a generally known plain spiral coil of aerogel impregnated aerogel blanket versus a second plot 1104 for a spiral coil CFC core module, according to one or more embodiments. CFC charged to 100% in roughly 19 seconds, while the plain version took 8 minutes, a 2600% decrease in time.

The CFC discharge testing was conducted on CFC prototypes AL02 and AL03. Heaters were controlled using the same 120 VAC, manual rheostat, adjustable from 0% to 100% for each test. Two discharge tests were conducted for each CFC: one at constant heater power, and another at varying heater power levels. In each test the decrease in mass due to discharging of the nitrogen was recorded via a scale and data acquisition computer.

Two small open-atmosphere cryogenic flasks were cooled down using normal boiling point LN2. The first was used to charge the CFC test article to 100%, and the other was used as a thermal shield for the CFC during the test. Once the CFC was fully charged the LN2 was dumped from the shielding flask, and it was placed onto a mass scale. The scale was zeroed, data recording initiated, and the CFC promptly placed into the shielding flask. The CFC heater was plugged into the rheostat, set to 60% but left off momentarily to record a general baseline discharge rate. After a couple minutes the rheostat was abruptly switched on at 60% and mass data was recorded for a length of time dictated by the test engineer.

The varying heater power tests were conducted in a similar fashion; however, the rheostat was cycled on and off, beginning at 20% and increasing by 10% each cycle up to 80%.

Figure 12:
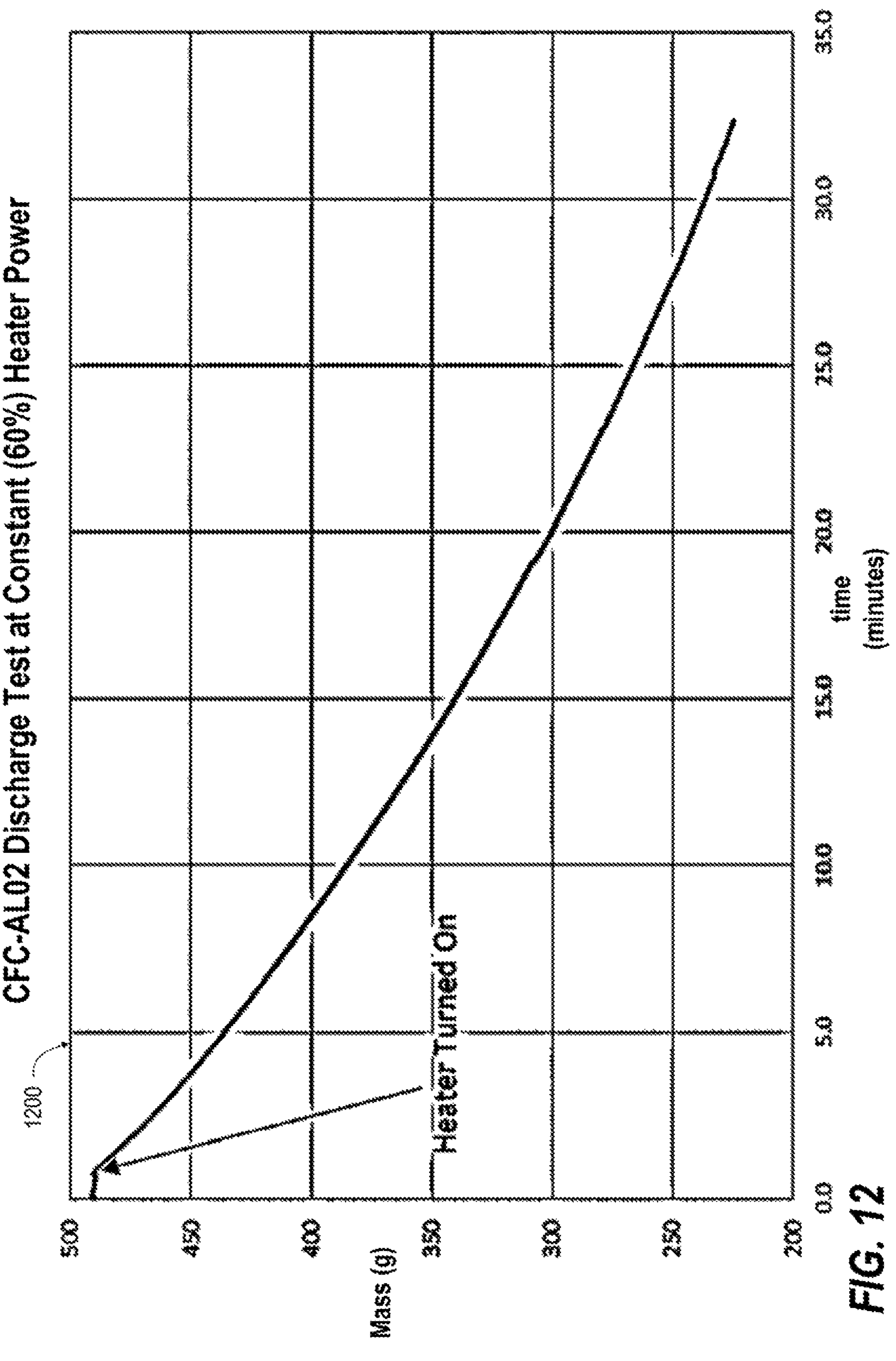
FIG. 12 is a graphical plot of time-to-discharge a first prototype spiral coil CFC core module with constant heater power, according to one or more embodiments.
Figure 13:
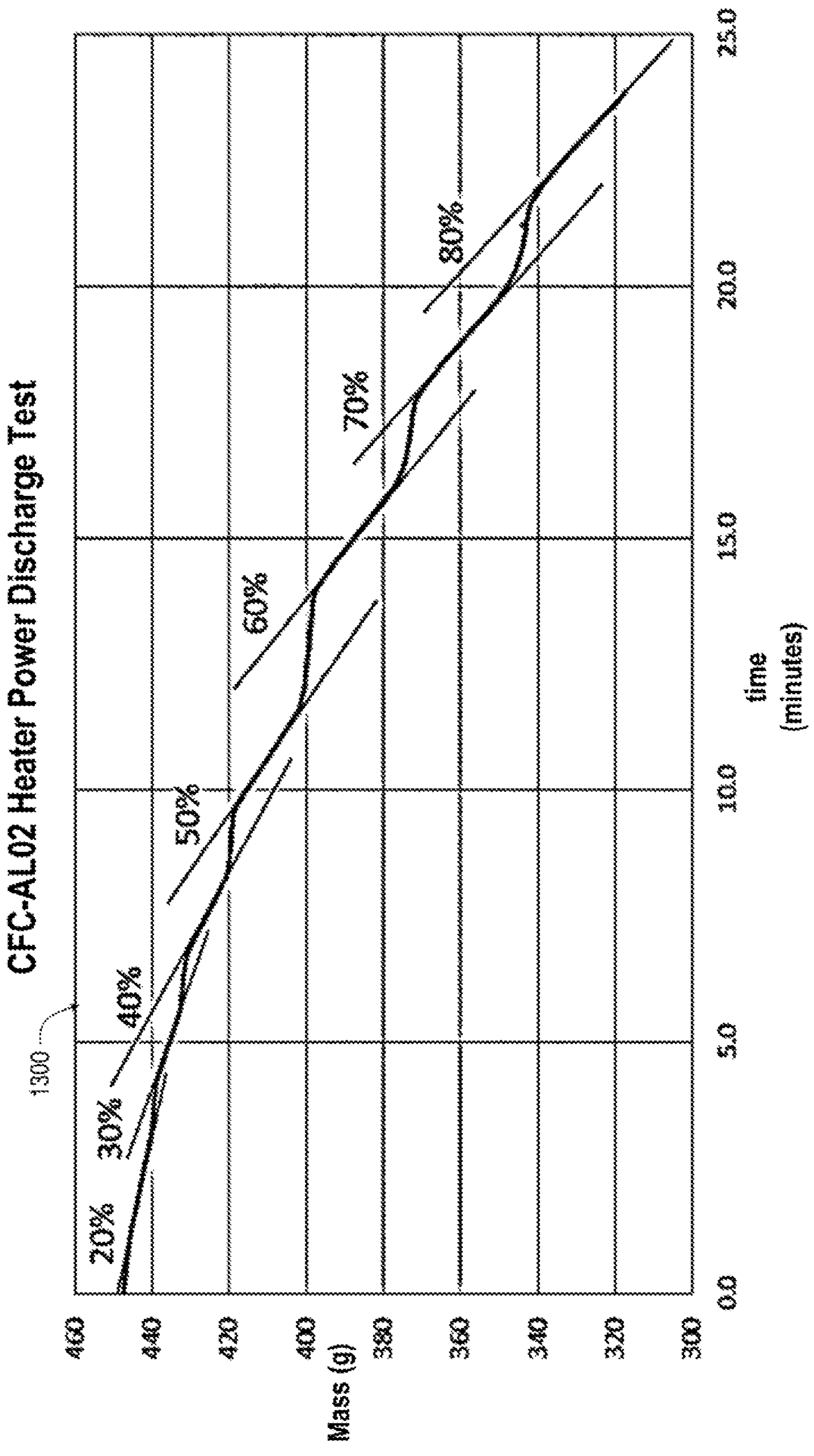
FIG. 13 is a graphical plot of time-to-discharge the first prototype spiral coil CFC core module with incremented heater power, according to one or more embodiments.
Figure 14:
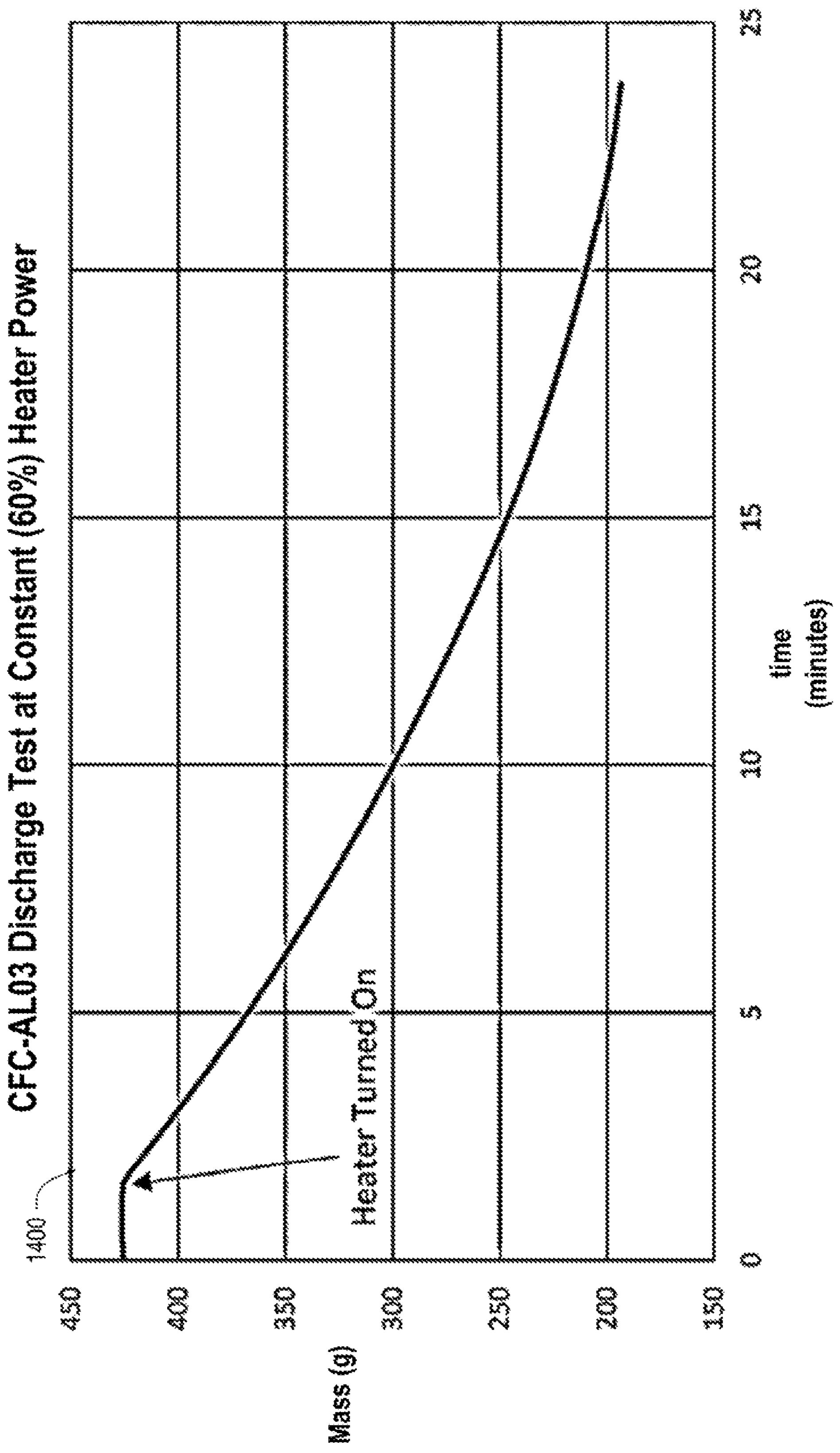
FIG. 14 is a graphical plot of time-to-discharge a second prototype spiral coil CFC core module with constant heater power, according to one or more embodiments.
Figure 15:
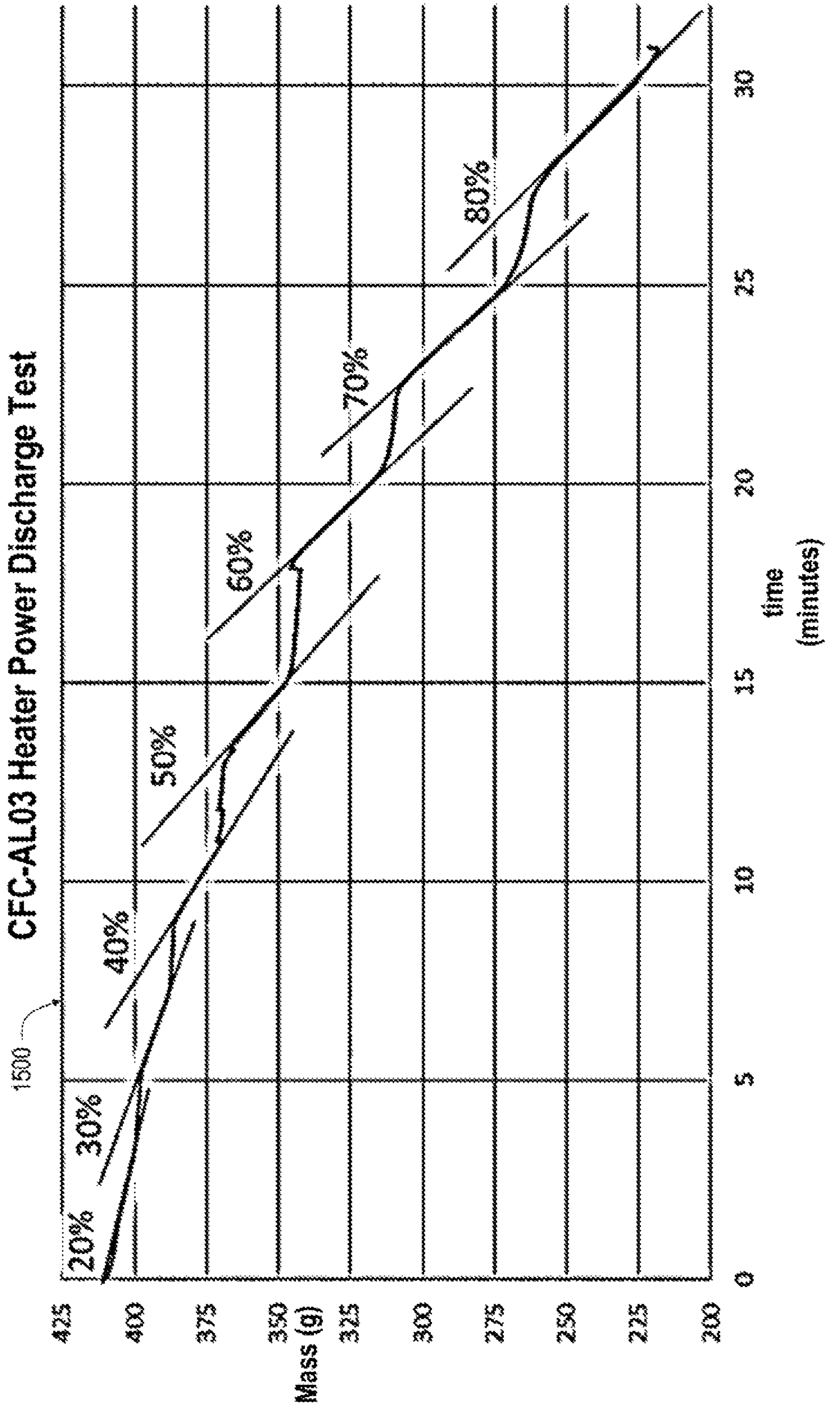
FIG. 15 is a graphical plot of time-to-discharge the second prototype spiral coil CFC core module with incremented heater power, according to one or more embodiments.

Results of CFC discharging tests of two CFC prototypes are shown in FIGS. 12-15, using two different heater integration methods, with liquid nitrogen. FIG. 12 is a graphical plot 1200 of time-to-discharge a first prototype spiral coil CFC core module with constant heater power of 60%, according to one or more embodiments. Results show that the CFC-AL02 can be readily discharged using the integrated heater approach. FIG. 13 is a graphical plot 1300 of time-to-discharge the first prototype spiral coil CFC core module with incremented heater power from 20% to 80% power steps. Results show that the discharge rate was relatively unaffected above 50% heater power. FIG. 14 is a graphical plot 1400 of time-to-discharge a second prototype spiral coil CFC core module with constant heater power, according to one or more embodiments. Results show that the CFC-AL03 can be readily discharged using the integrated heater approach. FIG. 15 is a graphical plot 1500 of time-to-discharge the second prototype spiral coil CFC core module with incremented heater power, according to one or more embodiments. Results show that the discharge rate was relatively unaffected above 50% heater power.

Figure 16:
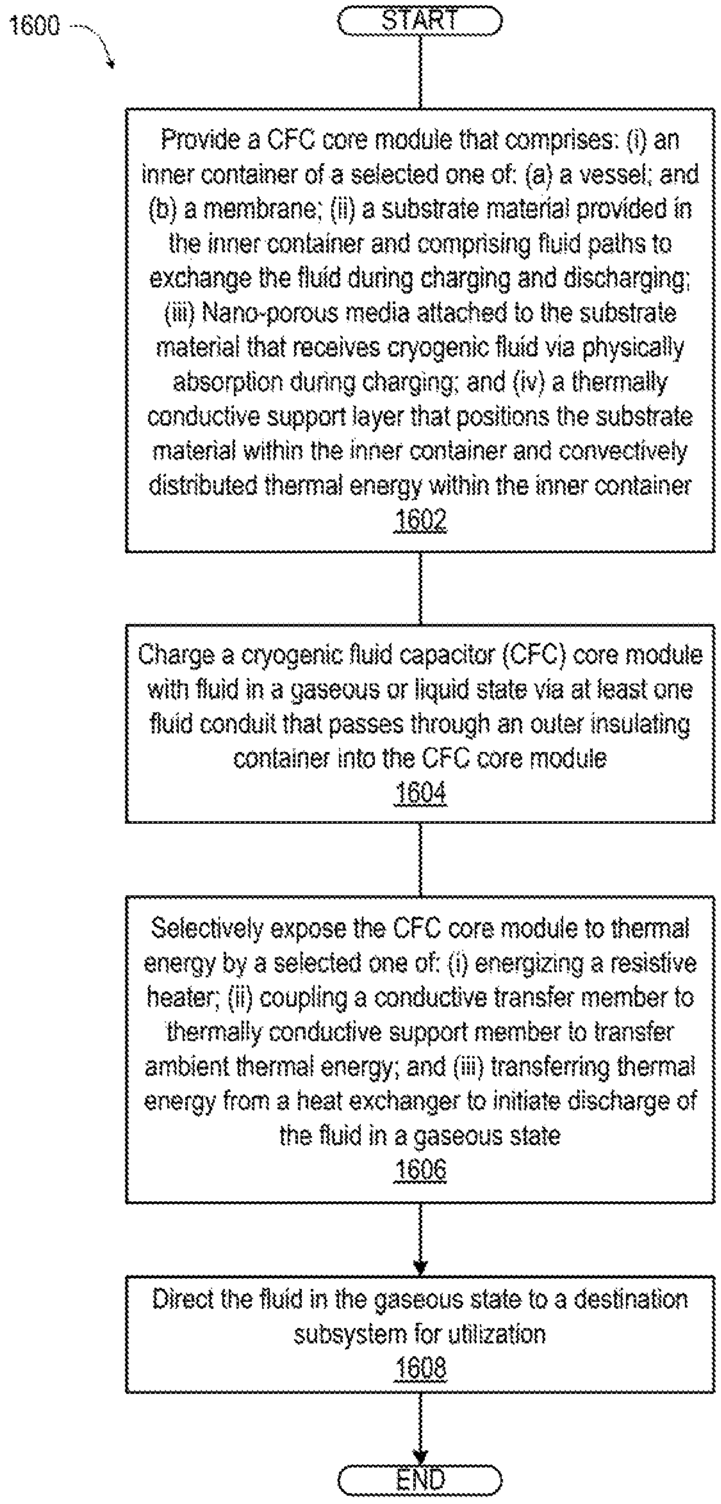
FIG. 16 is a flow diagram of a method of utilizing cryogenic flux or fluid capacitor for solid-state storage and on-demand supply of gases, according to one or more embodiments.

FIG. 16 is a flow diagram illustrating a method 1600 of utilizing cryogenic flux or fluid capacitor for solid-state storage and on-demand supply of gases. In one or more embodiments, method 1600 includes providing a CFC core module that comprises: (i) an inner container comprising a selected one of: (a) a vessel; and (b) a membrane; (ii) a substrate material provided in the inner container and comprising fluid paths to exchange the fluid during charging and discharging; (iii) nanoporous media attached to the substrate material that receives fluid via physically adsorption during charging; and (iv) a thermally conductive support layer that positions the substrate material within the inner container and conductively distributes thermal energy within the inner container (block 1602). Method 1600 includes charging a cryogenic flux capacitor (CFC) core module with fluid in a gaseous or liquid state via at least one fluid conduit that passes through an outer insulating container into the CFC core module (block 1604). Method 1600 includes selectively exposing the CFC core module to thermal energy by a selected one of: (i) energizing a resistive heater; (ii) coupling a conductive transfer member to thermally conductive support member to transfer ambient thermal energy; and (iii) transferring thermal energy from a heat exchanger to initiate discharge of the fluid in a gaseous state (block 1606). Method 1600 includes directing the fluid in the gaseous state to a destination subsystem for utilization (block 1608). Then method 1600 ends.

In the above described flow chart of FIG. 16, one or more of the methods may be embodied in an automated controller that performs a series of functional processes. In some implementations, certain steps of the methods are combined, performed simultaneously or in a different order, or perhaps omitted, without deviating from the scope of the invention. Thus, while the method blocks are described and illustrated in a particular sequence, use of a specific sequence of functional processes represented by the blocks is not meant to imply any limitations on the invention. Changes may be made with regards to the sequence of processes without departing from the scope of the present invention. Use of a particular sequence is therefore, not to be taken in a limiting sense, and the scope of the present invention is defined only by the appended claims.

The description of the present invention has been presented for purposes of illustration and description but is not intended to be exhaustive or limited to the invention in the form disclosed. Many modifications and variations will be apparent to those of ordinary skill in the art without departing from the scope of the invention. The described embodiments were chosen and described in order to best explain the principles of the invention and the practical application, and to enable others of ordinary skill in the art to understand the invention for various embodiments with various modifications as are suited to the particular use contemplated.

One or more of the embodiments of the invention described can be implemented, at least in part, using a software-controlled programmable processing device, such as a microprocessor, digital signal processor or other processing device, or a data processing apparatus or system. Thus, it is appreciated that a computer program for configuring a programmable device, apparatus, or system to implement the foregoing described methods is envisaged as an aspect of the present invention. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus, or system utilizes the program or a part thereof to configure the processing device, apparatus, or system for operation.

While the invention has been described with reference to exemplary embodiments, it will be understood by those skilled in the art that various changes may be made, and equivalents may be substituted for elements thereof without departing from the scope of the invention. In addition, many modifications may be made to adapt a particular system, device, or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc., do not denote any order or importance, but rather the terms first, second, etc., are used to distinguish one element from another.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

We claim:

1. A cryogenic flux capacitor (CFC) assembly, for storing and releasing cryogenic fluids, comprising:
- a CFC core module comprising:
  - an inner container comprising a selected one of: (i) a vessel; and (ii) a membrane; an aerogel blanket, comprising one or more blanket substrate layers substantially surrounding and containing a silica aerogel material provided in the inner container and comprising fluid paths to distribute fluid during charging and discharging that physically adsorbs the fluid in a liquid state during charging;
  - one or more thermally conductive support layers that conductively distributes thermal energy to the one or more blanket substrate layers;
  - wherein the aerogel blanket and one or more thermally conductive support layers is selected from a configuration of one of:
    - a sandwich configuration of multiple blanket substrate layers where top and bottom surfaces of each blanket substrate layer are longer than side surfaces, wherein multiple thermally conductive support layers are positioned between and against each top and bottom surface of the multiple blanket substate layers; or a single blanket substrate layer having a single thermal support layer positioned substantially across one side of the single blanket substrate layer is rolled into a spiral coiled configuration;
- an outer insulating container that encompasses the CFC core module; and
- at least one fluid conduit that directs transfer of at least one of: (i) the fluid in a gaseous or liquid state through the outer insulating container into the CFC core module during charging; and (ii) the fluid in a gaseous state out of the CFC core module and outer insulating container during discharging.

2. The CFC assembly of claim 1, wherein the one or more thermally conductive support layers comprise a channeled surface to facilitate fluid movement.

3. The CFC assembly of claim 1, further comprising a heat controller that supplies heat to the CFC core module to cause the fluid to release from the aerogel blanket to initiate discharge of fluid in a gaseous state from the CFC core module.

4. The CFC assembly of claim 1, further comprising a resistive heater element positioned within the outer insulating container and connectable to a heat controller via electrical conductors that pass through the outer insulating container.

5. The CFC assembly of claim 1, further comprising a thermally conductive transfer member thermally coupled to the one or more thermally conductive support layers and extending externally to the outer insulating container to at least one of: (i) send heat energy out of the CFC core module to decrease an internal temperature for charging and storage; and (ii) receive heat energy to initiate discharging of the fluid in the gaseous state.

6. The CFC assembly of claim 5, further comprising a heat exchanger coupled to the thermally conductive transfer member to decrease temperature within the CFC core module to increase adsorption of the fluid by the aerogel blanket during charging.

7. The CFC assembly of claim 1, wherein the at least one conduit comprises a first flow tube that directs a flow of cooling/heating fluid of a different temperature than the CFC assembly to result in at least one of: (i) receive cold power to decrease the internal temperature for charging and storage; and (ii) increase the internal temperature for discharging.

8. The CFC assembly of claim 7, wherein the at least one conduit comprises a second flow tube that directs a flow of fluid in a gaseous state from the CFC core module out of the container during at least one of: (i) venting during storage; and (ii) discharging.

9. The CFC assembly of claim 1, further comprising a heat exchanger coupled through the inner container to decrease the cryogenic temperature within the aerogel blanket to extend storage of the physically adsorbed fluid.

10. The CFC assembly of claim 1, further comprising a heat exchanger coupled through the inner container to increase the cryogenic temperature within the aerogel blanket to initiate discharging of the fluid in gaseous state.

11. The CFC assembly of claim 1, wherein the outer insulating container comprises a nonpressurized container that exposes the CFC core module to ambient pressure.

12. The CFC assembly of claim 1, wherein the outer insulating container comprises a pressure vessel that exposes the CFC core module to a selected pressure level.

13. The CFC assembly of claim 1, wherein the outer insulating container comprises a vacuum jacket that insulates at least a portion of the CFC core module.

14. The CFC assembly of claim 1, further comprising:

at least one temperature sensor positioned to sense temperature of the CFC core module; and a heat controller in communication with the at least one temperature sensor to control charging and discharging.

15. The CFC assembly of claim 1, further comprising:

more than one temperature sensor positioned at different vertical positions within the CFC core module to sense temperatures within the CFC core module; and a controller communicatively coupled to the more than one temperature sensor to determine a remaining stored capacity of the CFC core module based on a respective sensed temperature at the different vertical positions.

16. The CFC assembly of claim 1, further comprising a refrigeration subsystem coupled to the CFC module to at least one of: (i) charge and (ii) maintain the fluid in a liquid state, wherein said refrigeration subsystem comprises a selected one of: (i) a cryogenic fluid supply; (ii) a thermally conductive link coupled to an external source of cooling; and (iii) a conductive heat exchanger coupled to an external source of cooling.

* * * * *